(12) United States Patent
Chen

(10) Patent No.: US 12,095,241 B1
(45) Date of Patent: Sep. 17, 2024

(54) WIRE STRIPPING MACHINE

(71) Applicant: Shanghai Oceania International Co., Ltd., Shanghai (CN)

(72) Inventor: Alexander Yebo Chen, Lake Forest, CA (US)

( * ) Notice: Subject to any disclaimer, the term of this patent is extended or adjusted under 35 U.S.C. 154(b) by 0 days.

(21) Appl. No.: 18/637,868

(22) Filed: Apr. 17, 2024

(30) Foreign Application Priority Data

Mar. 27, 2024 (CN) .......................... 202420608262.5

(51) Int. Cl.
*H02G 1/12* (2006.01)
(52) U.S. Cl.
CPC .................................. *H02G 1/126* (2013.01)
(58) Field of Classification Search
CPC ........ H02G 1/126; H02G 1/12; H02G 1/1268; H02G 1/1248
USPC ........ 81/9.4, 9.51, 9.41, 9.42; 30/90.4, 90.8, 30/90.9
See application file for complete search history.

(56) References Cited

U.S. PATENT DOCUMENTS

| | | | | |
|---|---|---|---|---|
| 5,934,161 | A | * 8/1999 | Keene | .................. H02G 1/1256 81/9.51 |
| 2014/0318323 | A1 | 10/2014 | Zhang | |
| 2014/0345143 | A1 | 11/2014 | Newman | |
| 2016/0043534 | A1 | * 2/2016 | Zhang | .................... H02G 1/126 81/9.51 |
| 2022/0393446 | A1 | 12/2022 | Whipple | |

* cited by examiner

*Primary Examiner* — Phong H Nguyen

(57) ABSTRACT

A wire stripping machine includes a frame, a first shaft, a second shaft, and an adjustment component. The adjustment component includes a slider that supports the second shaft member and a positioning unit. The slider is supported on positioning unit by elastic members. Each adjusting member can be adjusted independently. When adjusting the adjusting member and/or the positioning unit, the distance between the positioning unit and the slider can be changed. By adjusting the adjusting member and/or the positioning unit, the specified pressure between the annular groove and the annular blade near either end of the wire inlet or outlet side of the second shaft member can be changed. The wire stripping machine with this configuration can improve the quality of wire stripping and reduce the loss of the blade on the basis of ensuring the wire stripping efficiency.

20 Claims, 7 Drawing Sheets

WIRE STRIPPING MACHINE

CROSS-REFERENCE TO RELATED APPLICATIONS

The application claims priority of Chinese patent application CN 202420608262.5, filed on Mar. 27, 2024, which is incorporated herein by reference in its entireties.

TECHNICAL FIELD

The present disclosure relates to the technical field of devices for stripping insulation layer of wires or cables, in particular to a wire stripping machine.

BACKGROUND

In order to protect the ecological environment, environmental protection is the current trend in the development of industrial production. Among them, the recycling of old materials plays an important role of achieving environmental protection. A wire or cable includes an inner core and an insulation layer (outer sheath) setting on the periphery of the inner core. Since the inner core and the insulation layer are made of different materials, when recycling wires or cables, the insulation layer needs to be stripped off, and the stripped insulation layer and inner core are separately classified and recycled.

Among the traditional wire stripping methods, manual stripping is used. The operator uses a knife to cut the insulation layer on the outer periphery of the wire to be stripped, and then manually peels the insulation layer off the inner core. However, the manual method is time-consuming and labor-intensive, and there are also safety hazards. In the traditional methods, mechanical stripping of cables using wire stripping machines is also provided. The blade in a conventional wire stripping machine is positioned to cut only through the insulation layer surrounding the wire without cutting the metal wire, allowing the insulation layer to be separated along the cut line and then be removed. However, when using this type of wire stripping machine to strip wires, the operator needs to adjust the position of the blade for different sizes and types of wires. When there is a need to strip wires of multiple different sizes, such configuration is also inefficient.

In order to improve the efficiency of wire stripping, there is also a wire stripping machine disclosed in the prior art that can strip wires of different diameters by setting up multiple wire channels and corresponding blades adapted to different wire diameters to strip cables of different diameters.

However, the inventor found that although the wire stripping machine of such configuration improved the wire stripping efficiency, it still has the problem of inaccurate blade cutting depth and high blade worn.

SUMMARY

The purpose of this disclosure is to provide a wire stripping machine that can improve the quality of wire stripping and reduce blade worn on the basis of ensuring the wire stripping efficiency.

The wire stripping machine provided includes: a frame that is supported on the supporting plane, a first shaft member that is rotatably provided in the frame, a second shaft member that is rotatably provided in the frame, and adjustment components; a plurality of annular blades are provided on the first shaft member, and the plurality of annular blades are arranged at intervals along the axial direction of the first shaft member; a plurality of annular grooves are provided on the second shaft member, and the plurality of annular grooves are arranged at intervals along the axial direction of the second shaft member, and multiple annular grooves and multiple annular blades are arranged in one-to-one correspondence, and the second shaft member is closer to the supporting plane than the first shaft member is; adjustment components including sliders that are respectively provided at both ends of the second shaft member, and the ends of the second shaft member are rotatably connected to the sliders; a pair of the positioning units are respectively provided at each end of the second shaft member; the slider located at either end of the second shaft member is supported on the pair of positioning units by the elastic members, and the connection position of the second shaft member and the slider is located between the contacting positions of the two elastic members and the slider; adjusting member arranged in one-to-one correspondence with the positioning unit; wherein, the wire stripping machine further includes a limiting portion, and each of the adjusting members can be adjusted independently, when adjusting the adjusting member and/or the positioning unit, the positioning unit can be driven to move toward the limiting portion, in the state where the slider is in contact with the limiting portion, continuing to adjust the adjusting member and/or the positioning unit can change the distance between the positioning unit and the slider; when stripping, the wire to be stripped is guided into the annular groove, the annular blade can cut into the outer sheath of the wire in the annular groove, and the elastic member is configured to be able to generate a specified pressure between the annular groove and the annular blade so that the annular blade completely cuts into the outer sheath of the wire to be stripped without cutting into the inner core; the adjustment member and/or the positioning unit can be adjusted to change the specified pressure at the wire inlet side or the wire outlet side at either end of the second shaft between the annular groove and the annular blade.

In one or more embodiments, wherein the adjustment component further includes a connecting rod, which is arranged through the slider, first end of the connecting rod is drivingly connected to the adjusting member, and second end of the connecting rod is connected to the positioning unit; when the adjusting member is adjusted, the positioning unit is driven to move toward the limiting portion through the connecting rod.

In one or more embodiments, wherein the second end of the connecting rod is provided with external threads on its outer periphery, and the positioning unit is a positioning nut threadedly connected to the second end, by twisting the positioning nut enables the positioning nut to move toward the limiting portion.

In one or more embodiments, wherein a pair of positioning nuts are provided at the second end of each connecting rod.

In one or more embodiments, wherein the elastic member is a coil spring sleeved on the outer periphery of the connecting rod.

In one or more embodiments, wherein the adjustment assembly further includes a structural member, which is threadedly connected to the adjustment member on one side and fixedly connected to the connecting rod on the other side, the frame body is also provided with a chute, and the structural member is slidably connected to the chute; when the adjusting member is twisted, the structural member can be driven to move along the chute and to pull the connecting rod.

In one or more embodiments, wherein the frame includes a top plate, the adjusting member passing through the top plate and is threadedly connected to the structural member, and the adjusting member is also provided with a first locking nut, the first locking nut is disposed above the top plate.

In one or more embodiments, wherein the frame further includes a side plate, and the chute is positioned at the side of the side plate which is close to the top plate.

In one or more embodiments, wherein the frame further includes a side plate, a notch is provided in the side plate, the slider is disposed in the notch, and the limiting portion is the bottom wall of the notch; wherein, a shock-absorbing spring is provided between the slider and the bottom wall.

In one or more embodiments, wherein the connecting rod is in clearance fit with the slider to allow the slider and the second shaft member connected thereto have a certain degree of freedom of movement along the second shaft member's axial direction.

In one or more embodiments, wherein the frame further includes a pair of side plates, each of which is provided with a fine-tuning assembly, and the fine-tuning assembly includes: a fine-tuning member that can extend or retract from the side plate along the axial direction of the second shaft member, and a locking member configured to be adjustable to allow or restrict the fine-tuning member from extending or retracting from the side panel; wherein, when the fine-tuning member on one side of the second shaft member is operated to retract, the fine-tuning member on the other side of the second shaft member can be extended to against the slider, thereby, the second shaft member can be adjusted to translate from one side to the other side along its axial direction within the range allowed by the clearance fit between the connecting rod and the slider.

In one or more embodiments, wherein the fine-tuning member is a fine-tuning bolt threadedly connected to the side plate, and the end of the fine-tuning bolt can be extended or retracted from the side plate by twisting the fine-tuning bolt, the locking member is a second locking nut threadedly connected to the fine-tuning bolt.

In one or more embodiments, the wire stripping machine further includes lead channels, the plurality of lead channels are configured to be one-to-one correspondence with the annular grooves.

In one or more embodiments, wherein the frame further includes a front panel, a plurality of through holes are opened in the front panel, and the through holes define the lead channels.

In one or more embodiments, wherein a plurality of the through holes have different aperture sizes, and a plurality of the annular grooves are respectively configured to have different groove widths and groove depths corresponding to the aperture sizes.

In one or more embodiments, wherein the plurality of through holes respectively include round holes with different inner diameters and rectangular holes with different inner circumferential profiles.

In one or more embodiments, wherein the first shaft member has a first driving end, the second shaft member has a second driving end, a first gear is provided at the first driving end, a second gear is provided at the second driving end, and the first gear meshes with the second gear for transmission; wherein, the first driving end of the first shaft member has a mating portion provided through the frame, through which torque can be applied to the first shaft member.

In one or more embodiments, wherein the wire stripping machine further includes a motor assembly, and the output end of the motor assembly is drivingly connected to the mating portion.

In one or more embodiments, wherein the wire stripping machine includes a base plate, and the base plate is fixed on the supporting plane; wherein, the output end of the motor assembly is configured with a third gear, the mating portion is configured as a fourth gear, and the third gear is connected with the fourth gear in transmission.

In one or more embodiments, wherein the third gear and the fourth gear are connected through a belt drive system.

The beneficial effects of this disclosure are:

This wire stripping machine configures the adjustment components into four, which allows the cutting depth of the annular blade to be adjusted more accurately, thereby improving the quality of wire stripping. At the same time, this wire stripping machine configures the second shaft member to be elastically supported to allow translational movement in the frame, together with the arrangement of four adjustment components, further reduces the wear rate of the tool and increases the service life of the tool.

The above description is only an overview of the technical solutions of the present application. In order to have a clearer understanding of the technical means of the present application, they can be implemented according to the content of the description, and in order to make the above and other purposes, features and advantages of the present application more obvious and understandable. The specific implementation methods of the present application are specifically listed below.

BRIEF DESCRIPTION OF THE DRAWINGS

Various other advantages and benefits will become apparent to those of ordinary skill in the art upon reading the following detailed description of the preferred embodiments. The drawings are for the purpose of illustrating preferred embodiments only and are not to be construed as limiting the application. Also, the same parts are represented by the same reference numerals throughout the drawings. In the attached picture.

DETAILED DESCRIPTION

The embodiments of the technical solution of the present application will be described in detail below with reference to the accompanying drawings. The following examples are only used to illustrate the technical solution of the present application more clearly, and are therefore only used as examples and cannot be used to limit the protection scope of the present application.

Unless otherwise defined, all technical and scientific terms used herein have the same meanings as commonly understood by those skilled in the technical field belonging to this application; the terms used herein are for the purpose of describing specific embodiments only and are not intended to be used in limitation of this application; the terms "including" and "having" and any variations thereof in the description and claims of this application and the above description of the drawings are intended to cover non-exclusive inclusion.

One example of an existing wire stripping machine adopts a four-spindle structure, which has multiple wire entry holes and includes a pair of wire-leading rollers and a pair of wire-cutting rollers. The wire-cutting rollers are respectively arranged on the upper and lower sides of the wire inlet direction to proceed cutting on both sides of the incoming wire. Such device has the problems of a large overall mechanism and a complicated transmission system. Another example is the BLUEROCK™ WS-212™ wire stripping machine provided by Newman Trading Company in Washington, USA. It has multiple wire entry holes and adopts a dual-spindle structure. One spindle is configured as a wire-leading roller and the other spindle is configured as a wire-cutting roller. The wire-cutting roller is configured to be elastically supported by a spring. When the cutting roller floats upward, the spring exerts elastic resistance on the wire-cutting roller so that the wire-cutting roller can cut through the sheath of the wire to be stripped. However, wire stripping machines similar to the WS-212™ configuration also have the problem of low tool life.

In order to provide a wire stripping mechanism with good wire cutting quality, high wire cutting efficiency and long service life, according to some embodiments of the present disclosure, a wire stripping machine is provided.

Figure 1:
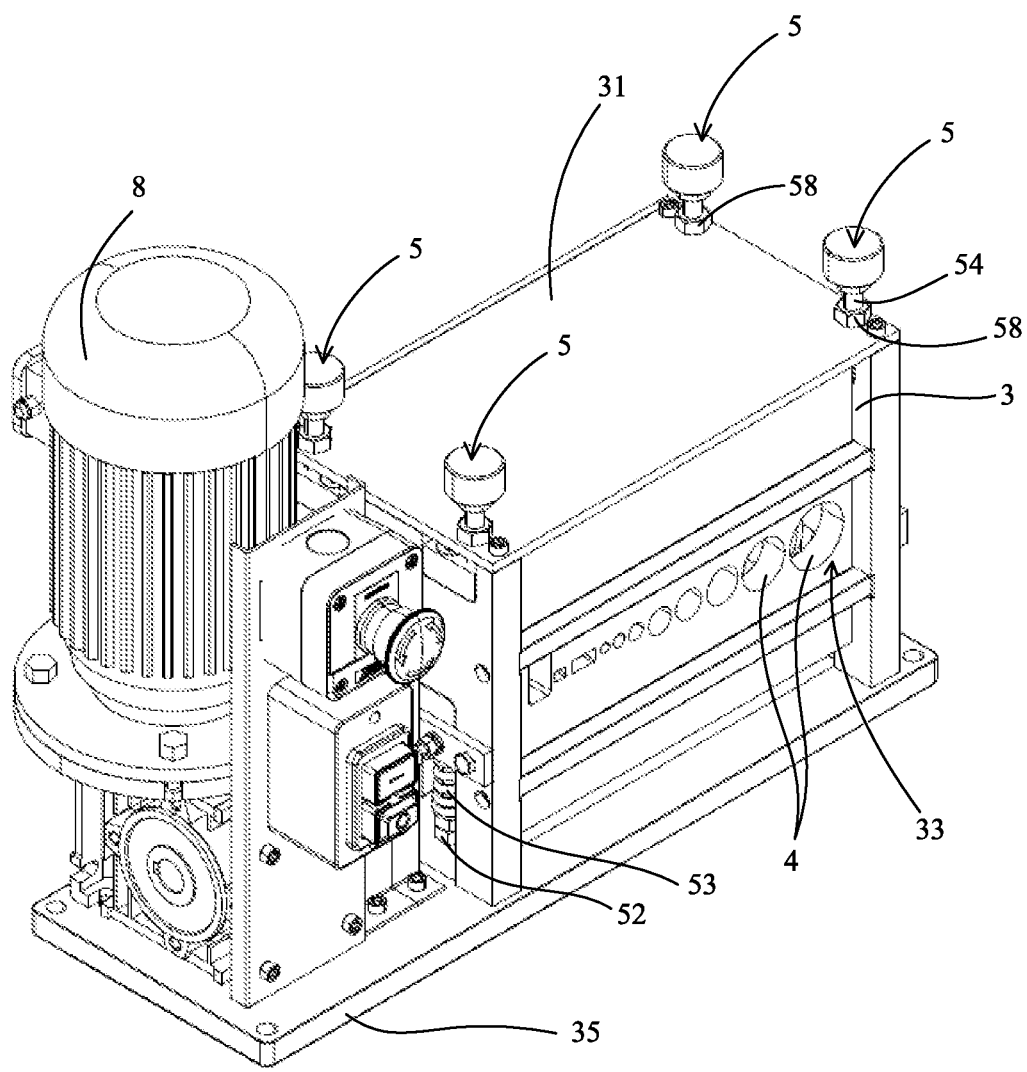
FIG. 1 shows a three-dimensional schematic view from one perspective according to some embodiments of the wire stripping machine.
Figure 2:
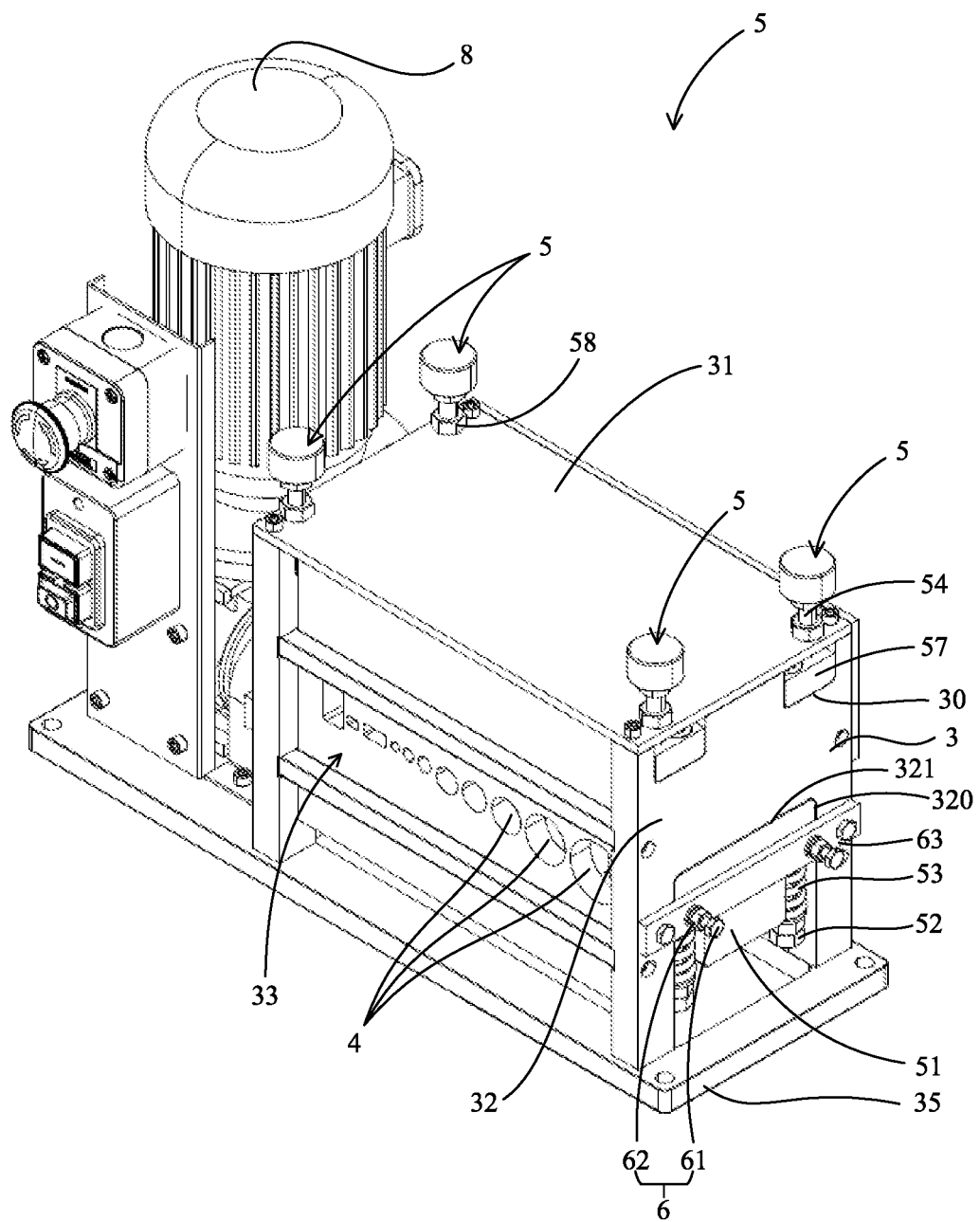
FIG. 2 shows a schematic three-dimensional view from another perspective according to some embodiments of the wire stripping machine.
Figure 3:
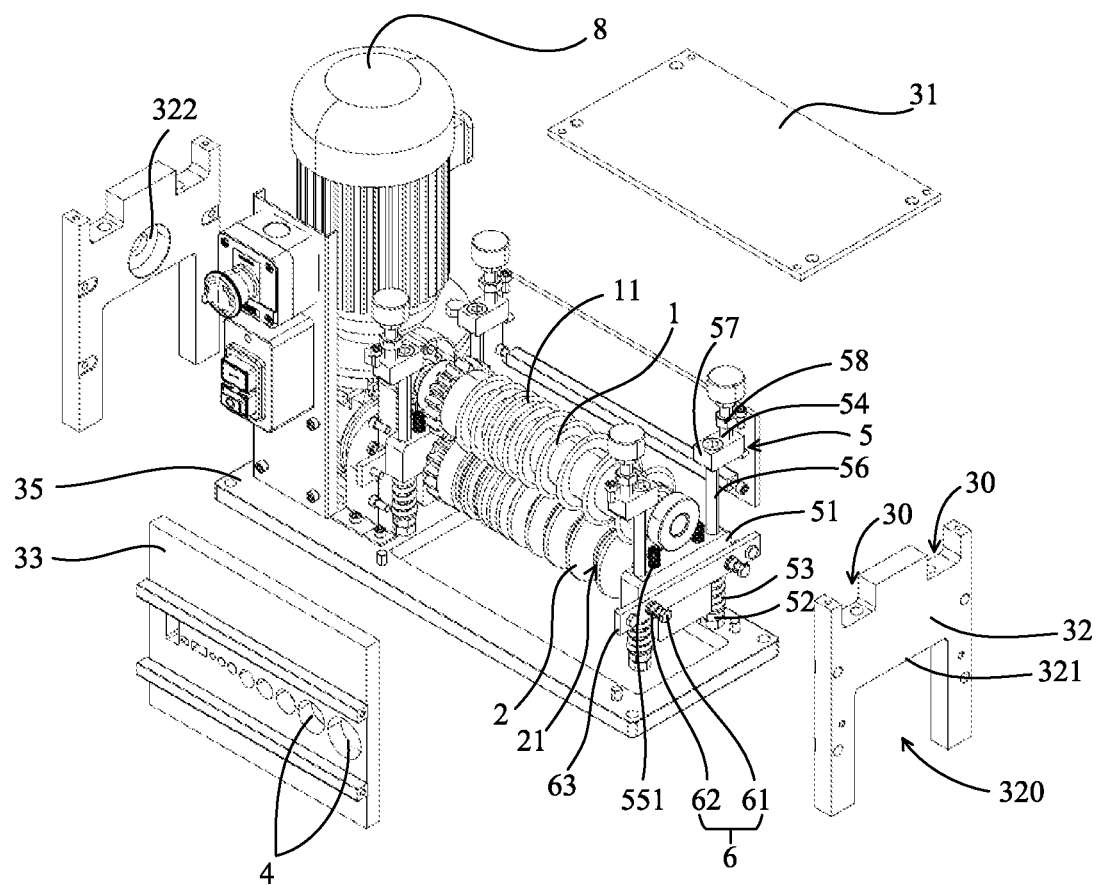
FIG. 3 shows an exploded schematic diagram of some embodiments of the wire stripping machine.

FIG. 1 shows a three-dimensional schematic view from one perspective according to some embodiments of the wire stripping machine, FIG. 2 shows a schematic three-dimensional view from another perspective according to some embodiments of the wire stripping machine, FIG. 3 shows an exploded schematic diagram of some embodiments of the wire stripping machine.

Those of ordinary skill in the art could understand that the axial direction described in one or more embodiments below is the direction of the axis, and the circumferential direction is the direction around the periphery. When describing the circumferential direction along a certain shaft, it means the circumferential direction along the circular cross-section of the shaft.

The wire stripping machine includes a first shaft member 1, a second shaft member 2, a frame 3 and an adjustment component 5.

The frame 3 is supported on a supporting plane. It could be understood that the supporting plane described herein stands for the plane on which the wire stripping machine is placed, such as a work surface or a desktop.

The first shaft member 1 is rotatably provided in the frame 3, which means when the first shaft member 1 is assembled in the frame 3, the first shaft member 1 can be rotated taking its own axis as the center of rotation relative to the frame 3. A plurality of annular blades 11 are provided on the first shaft member 1, and the plurality of annular blades 11 are arranged at intervals along the axial direction of the first shaft member 1. It can be understood that an annular blade is a ring blade arranged around the periphery of the first shaft member 1, and the edge of each annular blade 11 positioned away from the main body of the first shaft member 1 is configured as a blade edge for performing cutting work.

Figure 5:
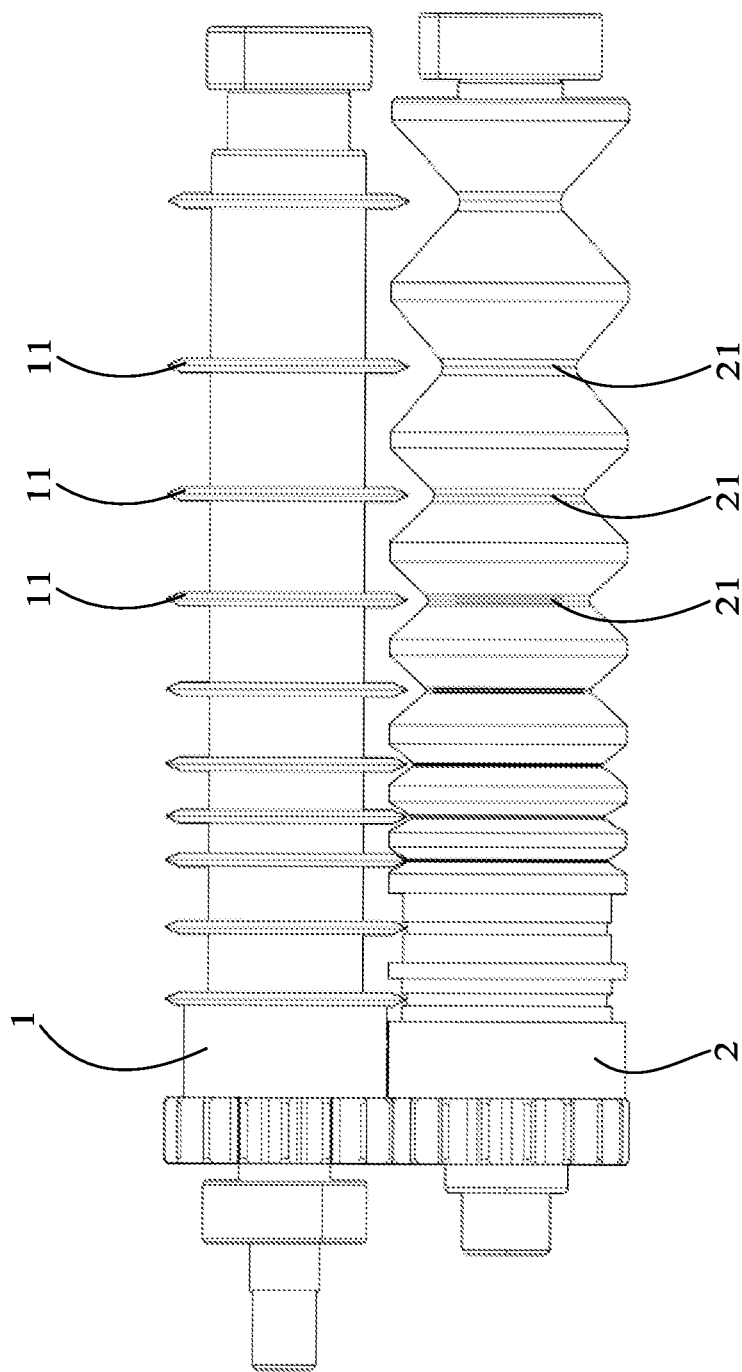
FIG. 5 shows a schematic diagram of the layout relationship between the first shaft member and the second shaft member according to some embodiments of the wire stripping machine.

The second shaft member 2 is rotatably provided in the frame 3, which means that when the second shaft member 2 is assembled in the frame 3, the second shaft member 2 can be rotated taking its own axis as the center of rotation relative to the frame 3. The second shaft member 2 is provided with a plurality of annular grooves 21, and the plurality of annular grooves 21 are spaced apart along the axial direction of the second shaft member 2. It could be understood that the annular grooves 21 are provided in the second shaft 2 around the circumferential direction of the second shaft 2. Each annular groove 21 forms a complete ring shape, and the annular grooves 21 can play a role in accommodating and guiding the wire to be stripped. As shown in FIG. 5, multiple annular grooves 21 and multiple annular blades 11 are arranged in one-to-one correspondence, that is, the annular blades 11 and annular grooves 21 have the same quantity, and each pair of annular groove 21 and annular blade 11 has the same axial position in the axial direction along the first shaft member 1 or the second shaft member 2, so that the center of the annular blade 11 is aligned with the center of the annular groove 21. The second shaft member 2 is closer to the supporting plane than the first shaft member 1 is. It could be understood that, in the assembled state, the first shaft member 1 and the second shaft member 2 are arranged substantially in parallel. Through the aforementioned configuration, each annular blade 11 is able to strip the wire passing through each annular groove 21.

The adjustment component 5 includes a slider 51, a positioning unit 52, an elastic member 53 and an adjusting member 54. Sliders 51 are respectively provided at both ends of the second shaft member 2. The ends of the second shaft member 2 are rotatably connected to the sliders 51, that is, the two ends of the second shaft member 2 are respectively supported by the two sliders 51. A pair of positioning units 52 are provided at each end of the second shaft member 2. The slider 51 located at either end of the second shaft member 2 is supported on the pair of positioning units 52 by elastic members 53. The connection position of the second shaft member 2 and the slider 51 is located between the contacting positions of the two elastic members 53 and the slider 51. Preferably, in the orthographic projection of the horizontal plane, the connection position of the second shaft member 2 and the slider 51 is located at the midpoint of the line connecting the two contacting positions of the two elastic members 53 and the slider 51. The adjusting member 54 and the positioning unit 52 are arranged in one-to-one correspondence.

The wire stripping machine also includes a limiting portion 321, and each adjusting member 54 can be adjusted independently. When adjusting the adjusting member 54 and/or the positioning unit 52, the positioning unit 52 can be driven to move toward the limiting portion 321. In the state where the slider 51 is in contact with the limiting portion 321, continuing to adjust the adjusting member 54 and/or the positioning unit 52 can change the distance between the positioning unit 52 and the slider 51. It could be understood that in a specific embodiment, the slider 51 and the limiting portion 321 may not contact with each other in an initial position or an adjusted position, and there is a certain space or gap between them. Under this circumstance, when adjusting the adjusting member 54 and/or the positioning unit 52, the positioning unit 52 and the slider 51 supported on the positioning unit 52 by the elastic member 53 can be driven to move toward the limiting portion 321 together, until the slider 51 and the limiting portion 321 are contacted. And at this moment, by continuing to adjust the adjusting member 54 and/or the positioning unit 52, the distance between the positioning unit 52 and the slider 51 can be changed. In another specific embodiment, the slider 51 and the limiting portion 321 are always in contact with each other in an initial position or an adjusted position. Under this circumstance, when the adjusting member 54 and/or the positioning unit 52 is adjusted, the positioning unit 52 moves toward the limiting portion 321 and changes the distance between the positioning unit 52 and the slider 51 at the same time.

By changing the distance between the positioning unit 52 and the slider 51, the elastic member 53 would generate different elastic forces between the positioning unit 52 and the slider 51, and thereby changing the external force required for the slider 51 to further compress the elastic member 53. Taking the direction shown in FIG. 3 as an example. Because both ends of the second shaft member 2 are elastically supported on the positioning unit 52 by the elastic member 53 through a pair of sliders 51 respectively, when the positioning unit 52 is operated to move upward, the distance between the positioning unit 52 and the slider 51 decreases, and the elastic member 53 clamped between the slider 51 and the positioning unit 52 exerts greater elastic force on the slider 51 and the positioning unit 52 respectively. At this time, under a same external force, the distance that the slider 51 can move toward the positioning unit 52 is reduced. Since the second shaft member 2 is elastically supported by the elastic member 53 through the slider 51, it results in that under a same external force, the displacement distance of the second shaft member 2 away from the first shaft member 1 decreases.

Figure 7:
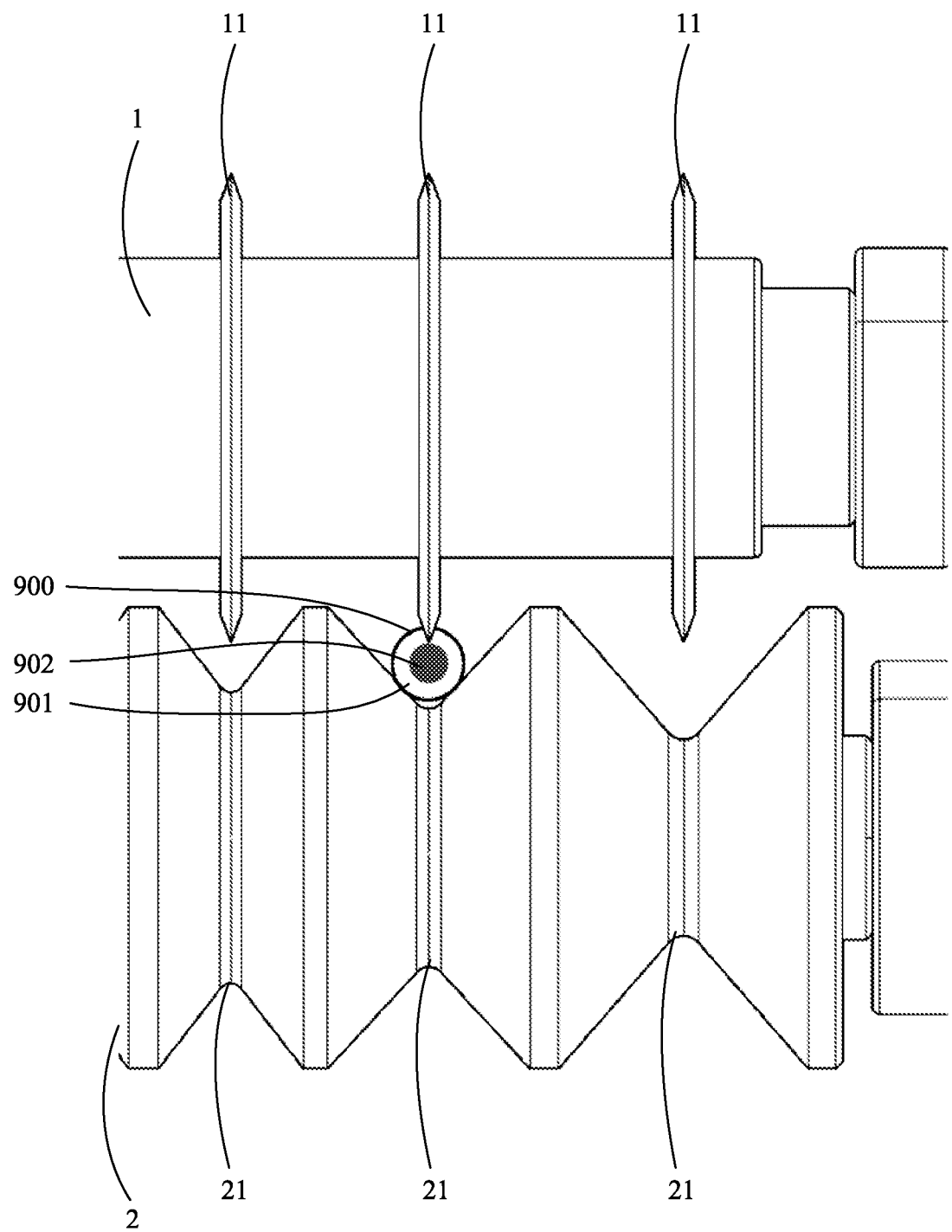
FIG. 7 shows a schematic diagram of a wire stripping process according to some embodiments of the present wire stripping machine.

FIG. 7 shows a schematic diagram of the wire stripping process according to some embodiments of the present wire stripping machine. When stripping, the wire 900 to be stripped is guided into the annular groove 21. The annular groove 21 drives the wire 900 to move through friction. At this time, the overall outer diameter of the wire 900 with sheath is larger than the distance between the annular blade 11 and the bottom of the annular groove 21, and the annular blade 11 and the wire 900 will contact with each other, so that the second shaft member 2 elastically supported moves away from the first shaft member 1 as a whole. The elastic force maintained by the elastic member 53 between the slider 51 and the positioning unit 52 is configured to generate a specified pressure between the annular groove 21 and the annular blade 11 so that the annular blade 11 only cuts into the outer sheath 901 of the wire 900 to be stripped, and without cutting into the inner core 902, that is, the state shown in FIG. 7. By adjusting the adjusting member 54 and/or the positioning unit 52, the elastic force maintained by the elastic member 53 between the slider 51 and the positioning unit 52 can be changed to achieve the specified pressure. In some specific embodiments, in order to configure the specified pressure so that the annular blade 11 completely cuts only into the outer sheath 901 of the wire 900 to be stripped without cutting into the inner core 902, it can be achieved through multiple trials and errors. For example, when the annular blade 11 does not completely cut into the outer sheath 901 of the wire 900 to be stripped, it can be adjusted to reduce the distance between the slider 51 and the positioning unit 52, so that under the same external force, the changed distance between the annular groove 21 and the annular blade 11 is reduced, which lead to the increase of the cutting depth of the annular blade 11. When the annular blade 11 interferes with the inner core 902 of the wire 900 to be stripped, it can be adjusted to increase the distance between the slider 51 and the positioning unit 52, so that under the same external force, the changed distance between the annular groove 21 and the annular blade 11 is increased, which lead to the decrease of the cutting depth of the annular blade 11.

It could be understood that the "specified pressure" described in this article stands for a pressure that is applied between the annular groove 21 and the annular blade 11 so that the annular blade 11 can completely cut into the outer sheath 901 of the wire 900 to be stripped without cutting into the inner core 902. Depending on the amount of the applied pressure, the second shaft member 2 with the annular groove 21 may or may not be displaced relative to the first shaft member 1 during the actual stripping process.

On this basis, since the adjustment component 5 are configured in two pairs in this wire stripping machine, and each adjusting member 54 can be adjusted independently, so that by adjusting the adjusting member 54 and/or the positioning unit 52, the specified pressure at the wire inlet side or the wire outlet side at either end of the second shaft 2 between the annular groove 21 and the annular blade 11 can be changed. The wire inlet side refers to the side where the wire enters the annular groove 21 in the second shaft member 2, and the wire outlet side refers to the side where the wire is led out of the annular groove 21. Compared with configuring only one pair of adjustment components at the shaft end, in this embodiment, two pairs of adjustment components 5 is configured in this machine, which allows the cutting depth of the annular blade 11 to be adjusted more accurately, thereby improving the peeling quality.

Furthermore, in addition to being able to more accurately adjust the cutting depth of the outer skin of the annular blade 11, the structural design of this embodiment can also achieve the effect of increasing the service life of the annular blade 11, specifically as follows: When recycling wires, most of the recycled wires are scrap products, the quality of wires is uneven, and sometimes the inner core of the wire is not completely smooth and columnar. In some extreme cases, there may be convex rings or ridges placed on the inner core, causing the outer diameter of the inner core to suddenly increase. When using the existing device such as BLU-EROCK™ WS-212™ as described above, if the outer diameter of the inner core suddenly increases, the elastic force exerted by the elastic member has been adjusted to generate the specified pressure, resulting in the distance between the cutting shaft and the leading wire shaft cannot be increased to allow the annular blade to avoid the sudden increase in the outer diameter of the inner core. External force is directly applied to the annular blade, resulting in tool wear. Since the positioning units 52 and their corresponding adjustment components 5 in this wire stripping machine are configured into four, they can be adjusted to apply different pressure at the wire inlet side or the wire outlet side at either end of the second shaft 2 between the annular groove 21 and the annular blade 11, in order to let the annular blade avoid the sudden increase in the outer diameter of the inner core. Specifically, for example, in an exemplary embodiment, by adjusting the distance between the slider 51 and the positioning unit 52 on the wire entry side of the second shaft member 2, the wire entry side elastic member 53 therebetween can exert a specified pressure to ensure that the annular blade 11 cuts only the outer skin of the wire under normal conditions. At the same time, by adjusting the distance between the slider 51 and the positioning unit 52 on the wire outlet side of the second shaft member 2, the wire outlet side elastic member 53 between them can exert an external force less than the specified pressure, so that when the annular blade 11 is in contact with the outer diameter suddenly enlarged part of the inner core, the elastic member 53 on the wire outlet side allows the second shaft member 2 to move a relatively larger distance away from the first shaft member 1, and the second shaft member 2 produces a slight oblique displacement away from the first shaft member 1. The displacement causes the distance between the annular blade 11 and the annular groove 21 to be slightly increased, allowing the annular blade 11 to avoid the sudden increase in the outer diameter part of the inner core.

At the same time, compared to arranging the first shaft member 1 in a movable manner, this wire stripping machine configures the second shaft member 2 (that is, the shaft with an annular groove 21) to be elastically supported in the frame 1 to allow translational movement relatively to the first shaft member 1, so that when being translated under the action of an external force, the annular groove 21 is the component that directly receives the force instead of the annular blade 11, thereby reducing the degree of hard collision of the annular blade 11 in the first shaft member 1, especially when facing the diameter suddenly increasing part of the inner core. When the diameter suddenly increases, such configuration and the method of configuring the adjustment components 5 into four individuals further reduce the wear rate of the tool and increase the service life of the tool.

Since the annular blade 11 and the first shaft member 1 can be regarded as one piece, when they are damaged, they need to be replaced as a whole, which is very time-consuming. By increasing the service life of the tool, the stripping efficiency of the wire stripping machine is improved to a certain extent.

In the description of the embodiments of this application, the technical terms "first component" and "second component", such as "first shaft member" and "second shaft member" are only used to distinguish different objects and cannot be understood as indications or implications. Relative importance or implicit indication of the quantity, specific order or priority relationship of the technical features indicated.

Reference herein to "an embodiment" means that a particular feature, structure or characteristic described in connection with the embodiment can be included in at least one embodiment of the present application. The appearances of this phrase in various places in the specification are not necessarily all referring to the same embodiment, nor are separate or alternative embodiments mutually exclusive of other embodiments. Those skilled in the art understand, both explicitly and implicitly, that the embodiments described herein may be combined with other embodiments.

It should be understood that the parallel arrangement of two components mentioned in the text means that the two components are parallel to each other and may have included angle. Preferably, the included angle with this direction is within 5°, and more preferably, the included angle is within 3°. The "along" a certain direction mentioned in the text means that it may have a included angle in this direction. Preferably, the included angle with this direction is within 10°, and more preferably, the included angle is within 5°.

In the description of the embodiments of this application, the term "and/or" is only an association relationship describing associated objects, indicating that there can be three relationships, such as A and/or B, which can mean: A exists alone, A and B exist simultaneously, and B exists alone.

Figure 4:
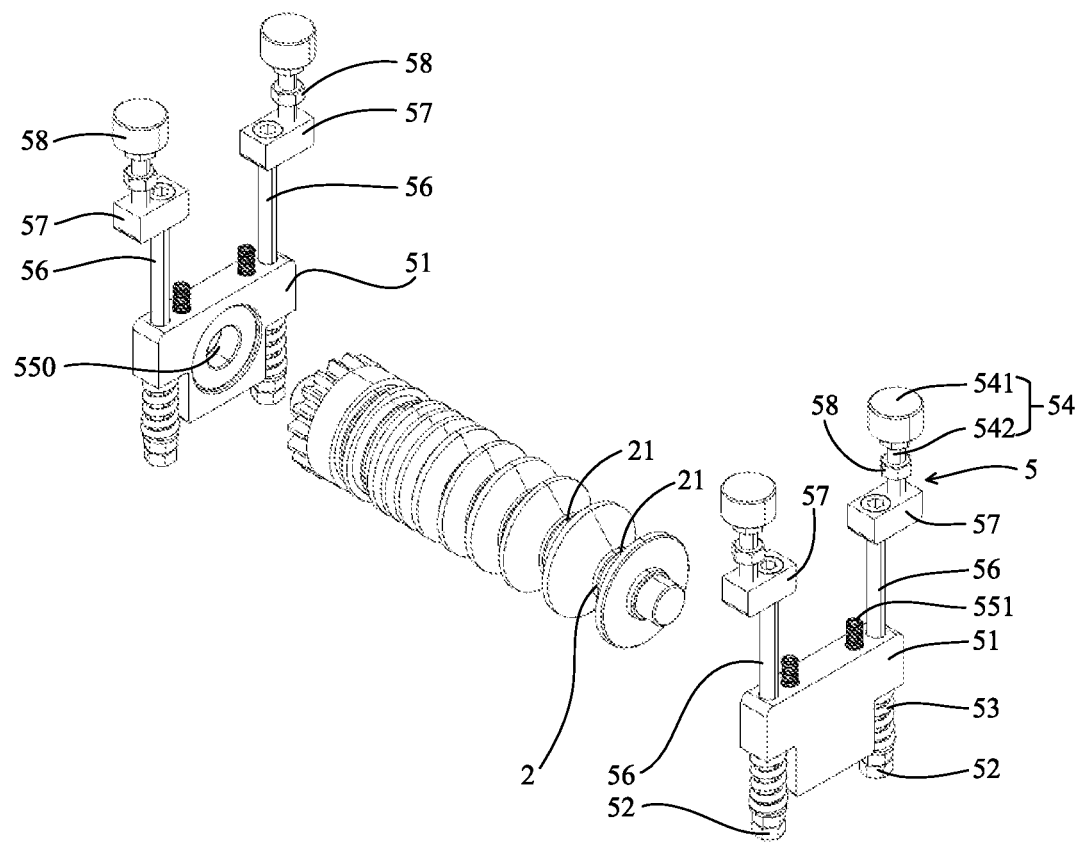
FIG. 4 shows a partially exploded schematic view of the second shaft member according to some embodiments of the wire stripping machine.

FIG. 4 shows a partially exploded schematic view of the second shaft member according to some embodiments of the wire stripping machine. In some embodiments of the wire stripping machine, the adjustment component 5 further includes a connecting rod 56. The slider 51 are provided at both ends of the second shaft member 2, and the ends of the second shaft member 2 are rotatably connected to the sliders 51. In the specific embodiment as shown in the figure, the slider 51 is in the shape of a T-shaped block, and the T-shaped block is configured to have convex portions protruding from the main body toward both sides, and the convex portions are configured to be the part in contact with the elastic member 53. By configuring the slider 51 into a T-shaped block as a whole would provide an enough space for the installation of the elastic member 53. A mounting hole 550 is provided in the middle of the slider 51, and the end of the second shaft member 2 is rotatably supported in the mounting hole 550 through components such as bearings. In some other suitable embodiments, the slider 51 may also have a different configuration than shown in the figures, such as a cross shape. The connecting rod 56 is arranged through the slider 51, first end of the connecting rod 56 is drivingly connected to the adjusting member 54, and second end of the connecting rod 56 is connected to the positioning unit 52. The term "drivingly connected" means that the external force can be transmitted to the connecting rod 56 through the adjusting member 54, so that when the adjusting member 54 is adjusted, the connecting rod 56 can be driven to move synchronously, thereby driving the positioning unit 52 through the connecting rod 56, and to let the positioning unit 52 move toward the limiting portion 321.

In some other embodiments that are different from those shown in the figures, the connecting rod 56 may not be provided, but a slide rail is configured in the frame 3 and the slider is configured in the slide rail in order that the movement direction of the slider can be guided.

In some embodiments of the wire stripping machine, the second end of the connecting rod 56 which passes through the slider 51 is provided with external threads on its outer periphery, and the positioning unit 52 is a positioning nut threadedly connected to said second end. By twisting the positioning nut, the positioning unit 52 can be driven to move toward the limiting portion 321. It can be understood that the positioning unit may have other arrangements different from this embodiment. For example, in an embodiment different from that shown in the figure, the positioning unit may be a snap ring. The distance between the positioning unit and the limiting portion 321 is changed by engaging the snap ring at different positions of the connecting rod 56. The adjustment of the positioning unit 52 can be pre-adjusted before the equipment leaves the factory, so that the distance between the slider 51 and the positioning unit 52 is preset. The adjustment of the distance between the slider 51 and the positioning unit 52 through the adjustment member 54 can be performed during use, thereby achieving a certain degree of freedom to fine-tuning the preset settings.

In some embodiments of the wire stripping machine, a pair of positioning nuts are provided at the second end of each connecting rod 56 which passes through the slider 51, so that double nuts are used to prevent loosening.

In some embodiments of the wire stripping machine, the elastic member 53 is a coil spring sleeved on the outer circumference of the connecting rod 56. In other suitable embodiments, the elastic member 53 may also have other configurations that can exert elastic force. Components such as elastic snap rings.

In some embodiments of the wire stripping machine, the adjustment components 5 further includes a structural member 57, which is threadedly connected to the adjusting member 54 on one side and fixedly connected to the connecting rod 56 on the other side. In the specific embodiment shown in FIG. 4, the adjusting member 54 has an operating portion 541 and an adjusting screw 542. The adjusting screw 542 is threadedly connected to a threaded hole on one side of the structural member 57. The connecting rod 56 is fixedly connected to the other side of structural member 57 by, for example, riveting. The frame 3 is provided with a chute 30, and the structural member 57 is slidably connected to the chute 30. The chute 30 guides the movement direction of the structural member 57 while limiting the rotation of the structural member 57. This allows the structural member 57 to be driven to move along the chute 30 when twisting the adjusting member 54, and to pull the connecting rod 56 and change the distance between the slider 51 and the positioning unit 52. In some other embodiments different from those shown in the figures, the connecting rod can be configured as a whole to be threadedly connected to the screw rod in the frame 3, so that the connecting rod can be twisted to adjust the distance between the slider 51 and the positioning unit 52.

In some embodiments of the wire stripping machine, the frame 3 includes a top plate 31, and the adjusting member 54 passes through the top plate 31 and is threadedly connected to the structural member 57, so that the adjusting member 54 is located entirely on the upper side of the equipment, making it easy to operate and adjust. The adjusting member 54 is also provided with a first locking nut 58. The first locking nut 58 is disposed above the top plate 31. The first locking nut 58 is threadedly connected to the adjusting screw 542 in the adjusting member 54. By twisting the first locking nut 58 till it is against the top plate 31, then the adjusting member 54 would be locked. At this time, the adjusting member 54 cannot be twisted. When there is no need to use the adjusting member 54 to change the distance between the slider 51 and the positioning unit 52, the first locking nut 58 is locked by twisting it. When it is necessary to use the adjusting member 54 to fine-tune the distance between the slider 51 and the positioning unit 52, firstly twist the first locking nut 58 to loosen it, and then fine-tune the distance between the slider 51 and the positioning unit 52 by twisting the adjusting member 54. In this embodiment, the supporting structure of the second shaft member 2 is as follows: the structural member 57 is connected to the top plate 31 by the adjusting screw 542, the positioning unit 52 is fixedly connected to the structural member 57 through the connecting rod 56, and the slider 51 is elastically supported on the positioning unit 52, the two ends of the second shaft member 2 are supported in the two sliders 51.

In some embodiments of the wire stripping machine, the frame 3 includes a side plate 32, and the chute 30 is positioned at the side of the side plate 32 which is close to the top plate 31. Compared with the method of opening the chute in the middle of the side plate, opening the chute 30 at the edge of the side plate 32 ensures that the main portion of the side plate 32 has reliable strength.

In some embodiments of the wire stripping machine, the frame 3 includes a side plate 32. A notch 320 is provided in the side plate 32. The slider 51 is disposed in the notch 320, and the limiting portion 321 is the bottom wall of the notch 320. It could be understood that the notch 320 has an opening, and the bottom wall of the notch 320 is the wall surface positioned opposite to the opening. It could be understood that in the schematic configuration of the wire stripping machine shown in the figure, the inner contour of the notch 320 seems to roughly match the outer contour of the slider 51. In fact, there is a small gap between the inner contour of the notch 320 and the outer contour of the slider 51, and the gap may be within 5 mm, preferably within 3 mm. This gap can allow the slider 51 to have a certain degree of micro-rotation freedom, so that the second shaft member 2 can produce a slight oblique displacement relative to the first shaft member 1. A shock-absorbing spring 551 is provided between the slider 51 and the notch 320. The shock-absorbing spring 551 can prevent the slider 51 from directly colliding with the notch 320 and causing vibration or abnormal noise when the wire stripping process is completed and the slider 51 returns to its initial position, which increases the stability of the wire stripping process. In some other embodiments different from those shown in the figures, the limiting portion 321 may be a stopper component with other suitable configurations, such as a convex part, provided in the frame body 1.

In some embodiments of the wire stripping machine, the connecting rod 56 has a clearance fit with the slider 51, which is, the inner diameter of the through hole opened in the slider 51 is slightly larger than the outer diameter of the connecting rod 56, so that the connecting rod 56 positioned in the through hole of the slider 51 could have a certain degree of freedom in translation and tilt movement in the radial direction, so as to allow the slider 51 and the second shaft member 2 connected thereto to have a certain degree of freedom of movement in the axial direction. At the same time, the second shaft member 2 can achieve a slight oblique displacement relative to the first shaft member 1.

Further, in some embodiments of the wire stripping machine, the frame 3 includes a pair of side plates 32, and a fine-tuning assembly 6 is provided on each side plate 32. The fine-tuning assembly 6 includes a fine-tuning member 61 and a locking member 62. The fine-tuning member 61 can extend or retract from the side plate 32 along the axial direction of the second shaft member 2. The locking member 62 is configured to be adjustable and has a locking position and a relaxed position. The locking member 62 limits the fine-tuning member 61 from extending or retracting relative to the side plate 32 in the locking position, and allows the fine-tuning member 61 to extend or retract relative to the side plate 32 in the relaxed position. When the fine-tuning member 61 on one end of the second shaft member 2 is operated to retract, the fine-tuning member 61 on the other end of the second shaft member 2 can be operated to extend against the slider 51 and further push the slider 51, thereby, the second shaft member 2 can be adjusted to translate from one end to the other end along its axial direction within the range allowed by the clearance fit between the connecting rod 56 and the slider 51. During the wire stripping operation, if the center of the annular blade 11 and the center of the annular groove 21 are not aligned, the axial position of the second shaft member 2 can be easily adjusted through the fine-tuning member 61 so that the center positions of the annular blade 11 and the annular groove 21 can be adjusted in real time during the wire stripping process. There is no need to disassemble the whole machine after stopping the machine and then reinstall the first shaft member 1 or the second shaft member 2 and then adjust it, which improves the efficiency of wire stripping process. Those of ordinary skill in the art can understand that the extension or retraction of the fine-tuning member 61 from the side plate 32 means that the end of the fine-tuning member 61 can extend or retract relative to the plane of the inner surface of the side plate 32.

Further, in some embodiments of the wire stripping machine, the fine-tuning member 61 is a fine-tuning bolt threaded in the side plate 32, and the end of the fine-tuning bolt can be extended or retracted from the side plate 32 by twisting the fine-tuning bolt. The locking member 62 is a second locking nut threadedly connected to the fine-tuning bolt. In the specific embodiment shown in the figure, a mounting plate 63 is connected to the outside of the notch 320 of the side plate 32. A threaded hole is provided in the mounting plate 63, and the fine-tuning member 61 is threadedly connected in the threaded hole, and the locking member 62 is threadedly connected to the fine-tuning member 61. When the locking member 62 is operated to be tightened on the mounting plate 63, the position of the locking member 62 can be locked and maintained. In other embodiments different from those shown in the figures, the fine-tuning member may also have other suitable structures, such as being configured as an adjustable telescopic rod. This embodiment described has the advantages of small overall size, convenient operation, and fine adjustment by configuring the fine-tuning member 61 as a fine-tuning bolt.

In some embodiments of the wire stripping machine, the wire stripping machine also includes lead channels 4, and the lead channels 4 are configured to be one-to-one correspondence with the annular grooves 21. The one-to-one correspondence means that the lead channels 4 and the annular grooves 21 have the same number. And the lead channels 4 correspond to the axial positions of the annular grooves 21 along the second shaft member 2. The lead channel 4 plays a role in guiding the wire to be stripped into the inside of the wire stripping machine. The lead channel 4 and the annular groove 21 jointly guide the wire to be stripped to ensure that the wire entering the wire stripping machine will not tilt or move relative to the wire entry direction in the section close to the annular blade 11, which ensures the stability of the wire stripping process.

Further, in some embodiments of the wire stripping machine, the frame 3 further includes a front panel 33, and a plurality of through holes are opened in the front panel 33, and the through holes define the lead channels 4. In other embodiments different from those shown in the figures, the lead channels 4 can also be provided by arranging external lead tubes and lead troughs. In this embodiment, by configuring and integrating the lead channel 4 into the frame body 3, the wire stripping machine has a small overall size.

In some embodiments of the wire stripping machine, the plurality of through holes (lead channels 4) provided in the front panel 33 have different aperture sizes, and the plurality of annular grooves 21 are respectively configured to have different groove widths and groove depths corresponding to the aperture sizes in order to accommodate wires of different diameters. It can be understood that when the annular grooves 21 have different groove widths, the two adjacent annular blade 11 provided on the first shaft member 1 can be configured to have different spacing to ensure that the center of each annular blade 11 are all aligned with the center of the corresponding annular groove 21, as shown in FIG. 5. It should be further explained that the groove width of the annular groove 21 means the width of the annular groove 21 along the axial direction of the second shaft member 2, and the groove depth of the annular groove 21 means the depth of the annular groove 21 along the radial direction of the second shaft member 2.

In some embodiments of this wire stripping machine, the plurality of through holes (lead channels 4) respectively include round holes with different inner diameters and rectangular holes with different inner circumferential profiles to adapt to the stripping needs of wires of different diameters. At the same time, adding rectangular holes with different inner circumferential profiles can be used to remove the outer sheath of the wire that has been cut open.

In some embodiments of the wire stripping machine, the front panel 33 is made of transparent material to enable visualization of the wire stripping process. In a specific embodiment, the front panel 33 is an acrylic panel.

Figure 6:
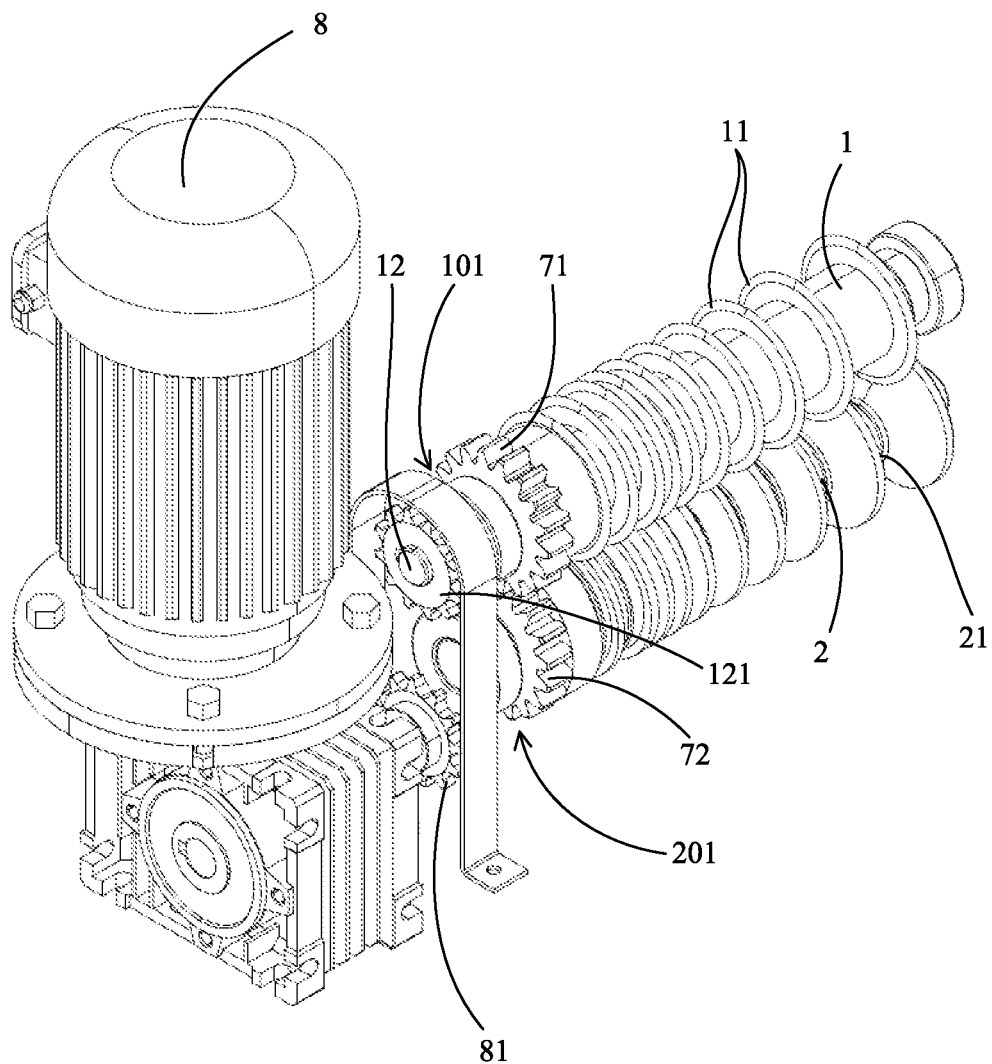
FIG. 6 shows a partial schematic diagram of the transmission structure according to some embodiments of the wire stripping machine.

FIG. 6 shows a partial schematic diagram of the transmission structure according to some embodiments of the wire stripping machine. In some embodiments of the wire stripping machine, the first shaft member 1 has a first driving end 101, and the second shaft member 2 has a second driving end 20. A first gear 71 is provided at the first driving end 101 and a second gear 72 is provided at the second driving end 201. The first gear 71 meshes with the second gear 72 for transmission. Among them, the first driving end 101 of the first shaft member 1 has a mating portion 12 provided through the frame 3, and torque can be applied to the first shaft member 1 through the mating portion 12. It can be understood that the implicit disclosure of this embodiment includes: the external teeth of the first gear 71 and the second gear 72 are configured so that when the second shaft 2 produces displacement or slight oblique displacement relative to the first shaft 1, the first gear 71 and the second gear 72 can still maintain transmission fit. Through the above structure, the first shaft member 1 and the second shaft member 2 are simultaneously driven to rotate through one power input, which could reduce the number of power source. At the same time, the first shaft member 1 and the second shaft member 2 are jointly configured to rotate during the wire stripping process, which can prevent the tool from cutting in just one portion of the blade and can further reduce the tool wear.

In one embodiment of the present wire stripping machine, the wire stripping machine is a hand-operated type, and a rocker is connected to the mating portion 12. The first shaft member 1 can be driven to rotate through the rocker, and then drive the second shaft 2 to rotate.

In another embodiment of the present wire stripping machine, the wire stripping machine is electric and also includes a motor assembly 8. The output end of the motor assembly 8 is drivingly connected to the mating portion 12. Compared with hand-operated type wire stripping, electric stripping machine uses motor assembly 8 as power input for wire stripping, which can significantly improve the wire stripping efficiency.

Further, in another embodiment of the present wire stripping machine, the wire stripping machine includes a base plate 35, and the wire stripping machine can be fixed on the supporting plane through the base plate 35. In a specific embodiment, the support plane is a desktop, and the bottom plate 35 is fixedly connected to the desktop through fasteners such as bolts. The second shaft member 2 is closer to the base plate 35 than the first shaft member 1 is, and the motor assembly 8 is supported on the base plate 35. The output end of the motor assembly 8 is configured with a third gear 81, and the mating portion 12 is configured as a fourth gear 121. The third gear 81 is connected with the fourth gear 121 in transmission.

Further, in another embodiment of the wire stripping machine, the third gear 81 and the fourth gear 121 are connected through a belt drive system.

In another embodiment of the wire stripping machine, as shown in FIG. 3, a mounting hole 322 is also provided in the side plate 32, and both ends of the first shaft 1 are rotatably supported in the mounting hole 322 through components such as bearings.

Finally, it should be noted that the above embodiments are only used to illustrate the technical solution of the present application, but not to limit it; although the present application has been described in detail with reference to the foregoing embodiments, those of ordinary skill in the art should understand that: The technical solutions described in the foregoing embodiments can still be modified, or some or all of the technical features can be equivalently replaced; and these modifications or substitutions do not deviate from the essence of the corresponding technical solutions from the technical solutions of the embodiments of the present application. The scope shall be covered by the claims and description of this application. In particular, as long as there is no structural conflict, the technical features mentioned in the various embodiments can be combined in any way. The application is not limited to the specific embodiments disclosed herein, but includes all technical solutions falling within the scope of the claims.

What is claimed is:

1. A wire stripping machine, wherein the wire stripping machine includes:
    a frame that is supported on a supporting plane;
    a first shaft member that is rotatably provided in the frame, a plurality of annular blades are provided on the first shaft member, and the plurality of annular blades are arranged at intervals along an axial direction of the first shaft member;
    a second shaft member that is rotatably provided in the frame, a plurality of annular grooves are provided on the second shaft member, and the plurality of annular grooves are arranged at intervals along an axial direction of the second shaft member, multiple annular grooves and multiple annular blades are arranged in one-to-one correspondence, and the second shaft member is closer to the supporting plane than the first shaft member is; and
    adjustment components, including:
        sliders that are respectively provided at both ends of the second shaft member, and the ends of the second shaft member are rotatably connected to the sliders;
        positioning units, a pair of the positioning units are respectively provided at each end of the second shaft member;
        elastic members, the sliders located at either end of the second shaft member is supported on the pair of positioning units by the elastic members, and a connection position of the second shaft member and the slider is located between contacting positions of the two elastic members and the slider; and
        an adjusting member arranged in one-to-one correspondence with the positioning unit;
    wherein, the wire stripping machine further includes a limiting portion, and each of the adjusting members can be adjusted independently, when adjusting the adjusting member and/or the positioning unit, the positioning unit can be driven to move toward the limiting portion, in the state where the slider is in contact with the limiting portion, continuing to adjust the adjusting member and/or the positioning unit can change the distance between the positioning unit and the slider; when stripping, the wire to be stripped is guided into the annular groove, the annular blade can cut into the outer sheath of the wire in the annular groove, and the elastic members are configured to be able to generate a specified pressure between the annular groove and the annular blade so that the annular blade completely cuts into the outer sheath of the wire to be stripped without cutting into the inner core; and
    the adjustment member and/or the positioning unit can be adjusted to change the specified pressure at a wire inlet side or a wire outlet side at either end of the second shaft between the annular groove and the annular blade.

2. The wire stripping machine according to claim 1, wherein the adjustment components further includes: a connecting rod, which is arranged through the slider, a first end of the connecting rod is drivingly connected to the adjusting member, and a second end of the connecting rod is connected to the positioning unit; when the adjusting member is adjusted, the positioning unit is driven to move toward the limiting portion through the connecting rod.

3. The wire stripping machine according to claim 2, wherein the second end of the connecting rod is provided with external threads on its outer periphery, and the positioning unit is a positioning nut threadedly connected to the second end, by twisting the positioning nut enables the positioning nut to move toward the limiting portion.

4. The wire stripping machine according to claim 3, wherein a pair of positioning nuts are provided at the second end of each connecting rod.

5. The wire stripping machine according to claim 2, wherein the elastic member is a coil spring sleeved on the outer periphery of the connecting rod.

6. The wire stripping machine according to claim 2, wherein the adjustment components further includes a structural member, which is threadedly connected to the adjustment member on one side and fixedly connected to the connecting rod on the other side, the frame body is also provided with a chute, and the structural member is slidably connected to the chute; when the adjusting member is twisted, the structural member can be driven to move along the chute and to pull the connecting rod.

7. The wire stripping machine according to claim 6, wherein the frame includes a top plate, the adjusting member passing through the top plate and is threadedly connected to the structural member, and the adjusting member is also provided with a first locking nut, the first locking nut is disposed above the top plate.

8. The wire stripping machine according to claim 7, wherein the frame further includes a side plate, and the chute is positioned at the side of the side plate which is close to the top plate.

9. The wire stripping machine according to claim 2, wherein the frame further includes a side plate, a notch is provided in the side plate, the slider is disposed in the notch, and the limiting portion is the bottom wall of the notch;
    wherein, a shock-absorbing spring is provided between the slider and the bottom wall.

10. The wire stripping machine according to claim 2, wherein the connecting rod is in clearance fit with the slider to allow the slider and the second shaft member connected thereto have a certain degree of freedom of movement along the second shaft member's axial direction.

11. The wire stripping machine according to claim 10, wherein the frame further includes a pair of side plates, each of which is provided with a fine-tuning assembly, and the fine-tuning assembly includes:
    a fine-tuning member that can extend or retract from the side plate along the axial direction of the second shaft member; and a locking member configured to be adjustable to allow or restrict the fine-tuning member from extending or retracting from the side panel;

wherein, when the fine-tuning member on one end of the second shaft member is operated to retract, the fine-tuning member on the other end of the second shaft member can be operated to extend against the slider, thereby, the second shaft member can be adjusted to translate from one end to the other end along its axial direction within the range allowed by the clearance fit between the connecting rod and the slider.

12. The wire stripping machine according to claim 11, wherein the fine-tuning member is a fine-tuning bolt threadedly connected to the side plate, and the end of the fine-tuning bolt can be extended or retracted from the side plate by twisting the fine-tuning bolt, the locking member is a second locking nut threadedly connected to the fine-tuning bolt.

13. The wire stripping machine according to claim 1, further includes lead channels, the plurality of lead channels are configured to be one-to-one correspondence with the annular grooves.

14. The wire stripping machine according to claim 13, wherein the frame further includes a front panel, a plurality of through holes are opened in the front panel, and the through holes define the lead channels.

15. The wire stripping machine according to claim 14, wherein a plurality of the through holes have different aperture sizes, and a plurality of the annular grooves are respectively configured to have different groove widths and groove depths corresponding to the aperture sizes.

16. The wire stripping machine according to claim 15, wherein the plurality of through holes respectively include round holes with different inner diameters and rectangular holes with different inner circumferential profiles.

17. The wire stripping machine according to claim 1, wherein the first shaft member has a first driving end, the second shaft member has a second driving end, a first gear is provided at the first driving end, a second gear is provided at the second driving end, and the first gear meshes with the second gear for transmission;

wherein, the first driving end of the first shaft member has a mating portion provided through the frame, through which torque can be applied to the first shaft member.

18. The wire stripping machine according to claim 17, wherein the wire stripping machine further includes a motor assembly, and an output end of the motor assembly is drivingly connected to the mating portion.

19. The wire stripping machine according to claim 18, wherein the wire stripping machine includes a base plate, and the base plate is fixed on the supporting plane;

wherein, the output end of the motor assembly is configured with a third gear, the mating portion is configured as a fourth gear, and the third gear is connected with the fourth gear in transmission.

20. The wire stripping machine according to claim 19, wherein the third gear and the fourth gear are connected through a belt drive system.

* * * * *